United States Patent [19]

Marsh, III et al.

[11] 4,075,086
[45] Feb. 21, 1978

[54] GLASS CONTAINER HANDLING

[75] Inventors: Samuel W. Marsh, III, Alton; Keith E. Zumwalt, Sr., Hartford, both of Ill.

[73] Assignee: Owens-Illinois, Inc., Toledo, Ohio

[21] Appl. No.: 711,942

[22] Filed: Aug. 5, 1976

Related U.S. Application Data

[63] Continuation of Ser. No. 565,205, April 4, 1975, abandoned.

[51] Int. Cl.² ............................................. B65G 29/00
[52] U.S. Cl. .................................... 209/73; 198/481; 250/223 B
[58] Field of Search ................. 209/111.7 T, 111.7 R, 209/73; 198/481, 480, 803; 250/223 B

[56] References Cited

U.S. PATENT DOCUMENTS

| | | | |
|---|---|---|---|
| 1,574,307 | 2/1926 | Risser | 198/22 B |
| 2,985,283 | 5/1961 | Carter | 198/481 X |
| 3,327,849 | 6/1967 | Sorbie | 209/111.7 T X |
| 3,393,799 | 7/1968 | Schmersal | 209/73 |

Primary Examiner—Robert B. Reeves
Assistant Examiner—Joseph J. Rolla
Attorney, Agent, or Firm—D. T. Innis

[57] ABSTRACT

Apparatus for the inspection of flask-type glass containers. Glass containers of the type having elongated necks and somewhat flattened main body portions, sometimes referred to as flask-type containers, may be inspected by conventional inspection devices if a particular handling system is used. The neck portion of the glass container is contained in a pocket formed in a neck holder carried by an upper, indexable starwheel. About 180° of the neck circumference is in contact with the neck holder pocket. An upper guide rail contacts that portion of the neck which extends beyond the neck holder. A lower, indexable starwheel has a large pocket cut therein to allow the flattened main body portion to rotate freely at an inspection station. The flask-type container is fully stabilized for rotation by the contact of the neck portion with the neck holder pocket and the upper guide rail.

4 Claims, 3 Drawing Figures

GLASS CONTAINER HANDLING

This is a continuation of application Ser. No. 565,205 filed Apr. 4, 1975, now abandoned.

BACKGROUND OF THE INVENTION

This invention generally relates to the inspection of glass containers. More particularly, this invention relates to the inspection of glass containers by a device which indexes glass containers from one inspection station to another. Specifically, this invention relates to an improvement in an inspection device of the type described which allows stable rotation during inspection of flask-type glass containers.

The inspection of glass containers is now frequently carried out by indexing-type devices which use multi-pocketed starwheels to move glass containers from inspection station to inspection station. One commonly used device is the FP machine sold by Owens-Illinois, Inc. There are numerous U.S. patents illustrating this machine, one example being U.S. Pat. No. 3,313,409. This machine requires rotation of the container under inspection at some stations. This is not a problem with round or at least generally round containers. In the past, it has not been possible to use FP type machines to inspect glass containers that may broadly be defined as flask-type glass containers. These are containers which have a relatively long neck portion and a flattened main body portion. Many containers for salad dressing are also of this same general type, although they are not usually referred to as flasks; however, the term "flask" will be used herein as a generic term which includes salad dressing containers. The problem with flask-type containers is that their lack of omni-directional symmetry made them extremely difficult to rotate in a stable mode. The finish portions tended to wobble during rotation, thus leading to inaccurate inspection. We have devised a handling system for FP type inspection machines that allows rotation of flask-type glass containers in a stable manner. The neck of the container is held in a neck holder, carried by a starwheel, and has about 180° of its circumference in contact with the neck holder. That portion of the neck which extends beyond the neck holder is in contact with a guide rail, thereby completing a stable chucking arrangement for the neck. The body portion may then be rotated and the finish portion will not wobble during rotation. An example of the prior art may be seen in U.S. Pat. No. 3,460,669.

SUMMARY OF THE INVENTION

Our invention resides in an apparatus for the inspection of glass containers. In this apparatus, glass containers are removed one at a time from a continually moving conveyor. The glass containers so removed are indexed through a plurality of inspection stations and acceptable glass containers are returned to an output conveyor for removal. We have made an improvement to this apparatus to allow inspection of glass containers having a finish portion, an elongated neck portion, and a flattened main body portion. The improvement includes an upper starwheel. A plurality of spaced-apart neck holders that are open at their peripheral edges to engage the neck portion of the glass containers are carried by the upper starwheel. A lower starwheel is vertically spaced apart from the upper starwheel and has a plurality of open pockets formed in its periphery to accept the flattened main body portion of the glass containers. The pockets in the lower starwheel are generally in vertical alignment with the neck holders. The glass containers move over a fixed slide plate during indexing. A lower guide rail is positioned to prevent escape of the main body portion from the pockets of the lower starwheel. An upper guide rail is positioned to be in contact with the neck portion of the glass containers.

DETAILED DESCRIPTION OF THE DRAWINGS

Figure 1:
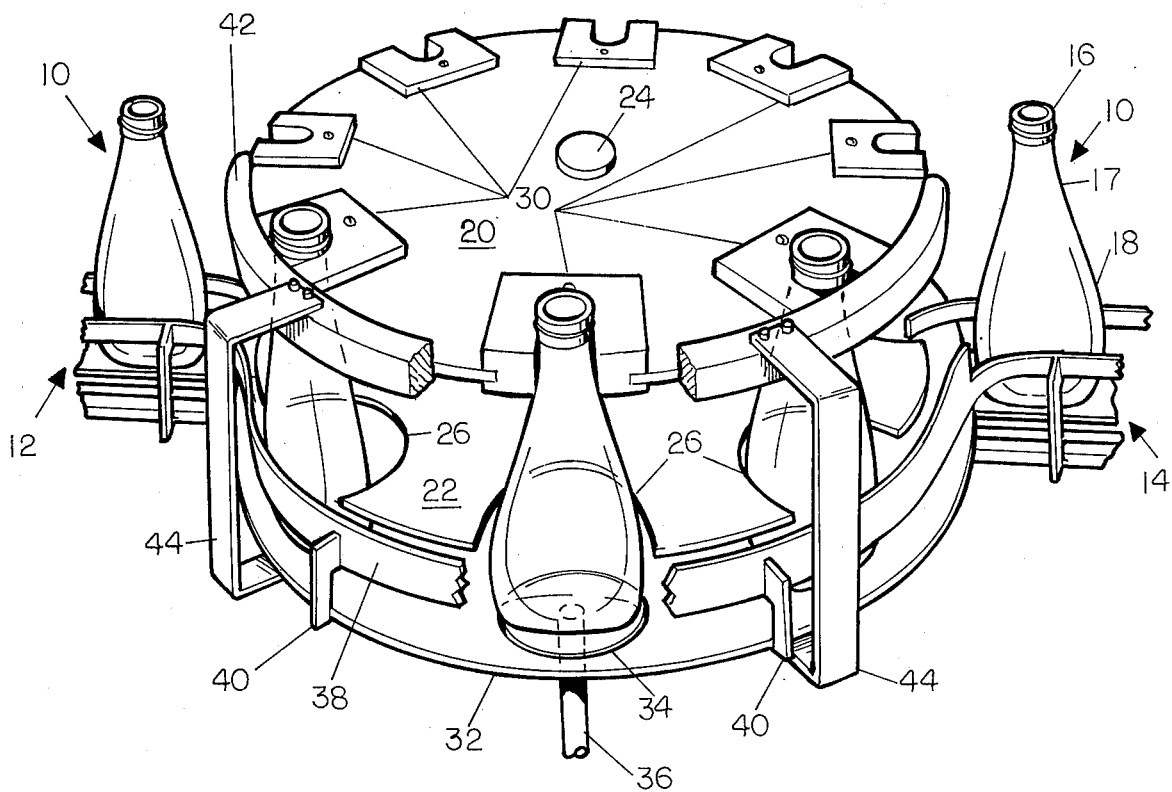
FIG. 1 is a perspective view of the apparatus of the present invention.

The apparatus of the present invention may best be understood as an improvement in the handling system of an inspection apparatus of the type generally shown in U.S. Pat. No. 3,313,400. This type of inspection apparatus is designed to inspect glass containers for various flaws which they may possibly contain and to reject defective containers. In FIG. 1, the actual inspection heads and the drive mechanism has been eliminated to focus attention more precisely upon the present invention. Glass containers 10 are fed to the inspection apparatus on a continuously moving inlet conveyor 12 in a single file. After inspection, good glass containers 10 are released from the inspection apparatus onto an outlet conveyor 14 which removes them for further processing and shipment. One of the problems with the general type of inspection apparatus disclosed in the previously cited patent is that oddly shaped containers could not be rotated for inspection. The handling mechanism of this general class of inspection apparatus is such that non-round glass containers present serious problems in stabilization while being inspected. Most of the inspection techniques employed require that the glass container 10 be rotated while being inspected. It is quite clear that round glass containers present no serious problem for rotation during inspection. However, glass containers of the flask-type or salad-dressing type present a problem in inspection. The glass containers 10 shown in FIG. 1 are of this type and specifically are of the type of container used for salad dressing. Such containers have a finish portion 16, a relatively elongated neck portion 17, and a somewhat flattened main body portion 18. The main body portion 18 is defined by a longitudinal dimension that is significantly greater than its transverse dimension. The difficulty in inspecting these containers resides in the fact that if the relatively flattened main body portion 18 is rotated, the glass container 10 lacks symmetry and the neck portion 17 and consequently the finish 16 tend to wobble during the inspection process. It is the finish portion 16 which requires the most critical inspection to assure that no flaws are present which might interfere with correct sealing of a closure to the container. Therefore, it has proven necessary to stabilize the neck portion 17 of the container 10 during the inspection process to allow proper functioning of the various optical inspection devices used. The handling system of the present invention utilizes an upper starwheel 20 and a lower starwheel 22. The upper and lower starwheels 20 and 22 are held on a common rotatable shaft 24 at a fixed elevation relative to one another.

The shaft 24 is rotated by an intermittent indexing drive mechanism and moves the glass containers 10 from station to station in an indexing fashion. The lower starwheel 22 has a plurality of relatively large pockets 26 cut into its peripheral area. The pockets 26 are much larger in extent than those normally seen in inspection devices of this general class. This is required because of the relatively wide long dimension of the main body portion 18 of the container 10 shown in FIG. 1. The relatively large pocket 26 is necessary to allow complete rotation of the glass container 10 at each inspection station. The upper starwheel 20 also has formed in its peripheral area a plurality of pockets 28 (see FIG. 2) into which are inserted neck holders 30. The neck holders 30 are preferably made of a material such as polyethylene which will not scratch the glass containers 10. The pockets 26 and the pockets 28 are in alignment so that a glass container 10 may be held between the two starwheels 20 and 22. As the glass containers 10 are indexed from station to station, their bottoms slide along a stationary slide plate 32. One of the stations is shown partially cut away in FIG. 1 and it may be seen that the base of the glass container 10 rests on a spinner pad 34 which is driven by a rotating shaft 36 in a manner well known in the art. During the time a glass container 10 is within the inspection device, its main body portion 18 is prevented from escape by a continuous curved guide rail 38 which is supported from the machine frame by brackets 40. The neck portion 17 of the glass container 10 is restrained from movement during both indexing and rotation for inspection by an upper continuous guide rail 42. The guide rail 42 also extends around the entire area of the upper starwheel 20 which encompasses the inspection stations. The upper guide rail 42 is supported from the machine frame by brackets 44.

Figure 2:
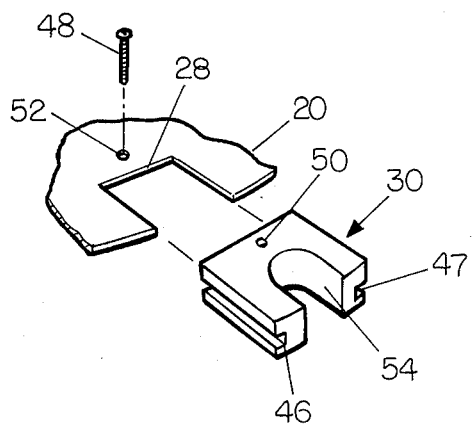
FIG. 2 is an exploded perspective view of the assembly of a neck holder to the upper starwheel.

As best seen in FIG. 2, all of the neck holders 30 have formed on their sides grooves 46 and 47 which slide into the pockets 28 formed in the upper starwheel 20. When in position, a lock pin 48 may be inserted into a hole 50 extending completely through the neck holder 30 and into a corresponding hole 52 formed in the upper starwheel 20. This then locks each of the neck holders 30 into position. Each of the neck holders 30 has formed in them an open pocket 54 of a specific configuration which will be discussed further with respect to FIG. 3.

Figure 3:
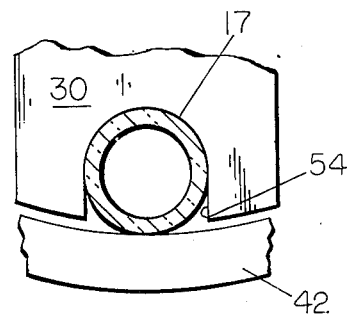
FIG. 3 is a top plan view showing the contact of the container neck with the neck holder pocket and the upper guide rail with the finish portion of the container removed.

As seen in FIG. 3, the pocket 54 in the neck holders 30 are all designed such that the neck portion 17 of the glass container 10 has substantially 180° contact with the rear portion of the pocket 54. The outwardly extending portion of the neck 17 is in linear or line contact with the upper guide rail 42. Thus the neck portion 17 of the glass container 10 is completely stabilized and held in a fixed location so that the bottom of the glass container 10 may be rotated. This particular contact configuration is a departure from the generally used techniques of the prior art in that normally the pockets into which glass containers are placed for rotation were designed to provide three point contact for the glass containers. This would be sufficient for a symmetric type of glass container and would provide sufficient stabilization in such a case. However, the unsymmetric configuration of flask-type glass containers requires that a greater surface area be supported during rotation. This is provided by the 180° contact of the neck with the back of the pocket 54 in the neck holder 30 and with the linear contact of the extending portion of the neck 17 with the upper guide rail 42. Note that the thickness of the neck holders 30 is approximately two-thirds of the total height of the neck portions 17, and should be at least one-half of the neck height. Likewise, the vertical height of the upper guide rail 42 should be between one-half and two-thirds of the total length or height of the neck portion 17. It is important that a significant percentage of the total available height of the neck portions 17 be supported by the neck holder 30 and the upper guide rail 42 to completely stabilize the glass container 10 while it is rotated for inspection purposes.

What we claim is:

1. In an apparatus for the inspection of glass containers which removes glass containers one at a time from a continually moving conveyor, wherein said glass containers are indexed through a plurality of inspection stations and acceptable glass containers are returned to an output conveyor for removal, the improvement in said apparatus to allow inspection of glass containers having a finish portion, an elongated neck portion and a flattened main body portion which comprises, in combination:

an upper starwheel;

a plurality of spaced-apart neck holders that are open at their peripheral edges to engage substantially 180° of the circumferences of the neck portion of said glass containers, said neck holders being carried by said upper starwheel and having a height that is at least one-half the height of said neck portion;

a lower starwheel, vertically spaced apart from said upper starwheel, said lower starwheel having a plurality of open pockets formed in the periphery thereof to accept the flattened main body portion of said glass containers, said open pockets being generally in vertical alignment with said neck holders;

a fixed slide plate upon which said glass containers ride during indexing;

a circular spinner pad at at least one of the inspection stations for spinning a glass container positioned thereon;

a lower guide rail positioned to prevent escape of said main body portion of said glass containers from said open pockets in said lower starwheel;

an upper guide rail positioned in contact with said neck portion of said glass containers, said upper guide rail having a height that is at least one-half the height of said neck portion; and said upper and lower guide rails confining the containers to the area of the pockets in the starwheels but permitting rotation of the containers so confined about their vertical axes.

2. The improvement of claim 1 wherein said upper starwheel is further defined by a plurality of open pockets formed in the periphery thereof, and wherein said neck holders include a pair of grooves formed in the sides there-of to allow slipping said neck holders into said upper starwheel pockets.

3. The improvement of claim 2 which further includes:

means for holding said neck holders in position in said upper starwheel pockets.

4. The improvement of claim 3 wherein said upper starwheel is further defined by an opening formed therein radially inward of said pockets thereof, wherein said neck holders are further defined by an opening formed therein that aligns with said opening in said upper starwheel when said neck holders are engaged therewith, and wherein said means for holding said neck holders comprises:

lock pins inserted through said openings in said neck holders and said upper starwheel.

* * * * *